July 7, 1953 J. C. PACILIO 2,644,188
PNEUMATIC CONTAINER CLEANING APPARATUS
Filed March 26, 1952 4 Sheets-Sheet 1

INVENTOR.
Joseph C. Pacilio,
BY
Cromwell, Greist & Warden
ATTYS.

July 7, 1953 J. C. PACILIO 2,644,188
PNEUMATIC CONTAINER CLEANING APPARATUS
Filed March 26, 1952 4 Sheets-Sheet 3

INVENTOR.
Joseph C. Pacilio,
BY
Cromwell, Greist & Warden
Attys.

July 7, 1953     J. C. PACILIO     2,644,188
PNEUMATIC CONTAINER CLEANING APPARATUS
Filed March 26, 1952     4 Sheets-Sheet 4

INVENTOR.
Joseph C. Pacilio,
BY
Cromwell, Greist & Warden
Attys

Patented July 7, 1953

2,644,188

UNITED STATES PATENT OFFICE 2,644,188

PNEUMATIC CONTAINER CLEANING APPARATUS

Joseph C. Pacilio, Cicero, Ill., assignor to White Cap Company, Chicago, Ill., a corporation of Delaware Application March 26, 1952, Serial No. 278,701

8 Claims. (Cl. 15—304)

This invention relates to apparatus for cleaning containers prior to filling and to certain innovations and improvements therein. More particularly, the invention relates to apparatus for pneumatically removing dust, dirt and debris from glass containers as they are conveyed to apparatus for filling and capping the same.

Glass containers are widely and extensively used for packaging foods and many other products. Just prior to being filled the containers should be freed of all dirt, dust and debris, especially when food products are being packed therein. A surprising amount of dirt, dust and foreign matter collects in empty glass containers prior to filling. The collection of a certain amount of dirt and dust therein is practically unavoidable. In addition, other debris finds its way into the glass containers prior to use typically including such foreign objects as: pieces of glass and metal, pieces of paper and corrugated paperboard, excelsior packing, paper clips, pieces of glue, etc. It is essential that such debris be removed from the containers prior to filling, and it is highly desirable to also remove dust and smaller particles of dirt which may be in the containers even though the dust and fine dirt particles might not be noticed or detected after they are filled. The apparatus may also be used for similarly cleaning other types of containers, such as tin cans and paperboard containers.

Since the filling and capping units are made adjustable so as to be able to handle containers of various sizes including variations in height, it is essential that the unit for cleaning the containers be likewise adjustable so as to also handle containers of various heights.

The object of the invention, generally stated, is an apparatus for pneumatically cleaning glass and other containers conveyed in procession past the cleaning unit which is vertically adjustable to accommodate containers of various heights and which operates to completely free the containers of any loose dirt, dust or debris that may be lodged therein and to simultaneously remove such foreign matter away from the containers so that it does not fall into containers that have already been cleaned.

Further and additional objects of the invention include the provision of such a unit or apparatus for pneumatically cleaning containers having the following features and characteristics: the unit is self-contained and may be moved about as required; the unit may be conveniently adjusted from the exterior to accommodate containers of various heights conveyed on the same conveyor; the unit is completely enclosed in a cabinet comprising an upper housing which fits telescopically over a lower housing; the unit includes a nozzle for blowing a jet of air into the mouth of a container and a surrounding bonnet in which suction is created around the nozzle for withdrawing and carrying away the dirt laden air forced out of the mouths of the container by the air jet; separate blower means are provided for such nozzle and suction bonnet; and, a hood is provided over such bonnet and nozzle in which the blower for the nozzle is also located, said hood fitting over the conveyor so as to cover not only the particular container being cleaned but also the containers adjacent thereto.

Certain other objects of the invention will, in part, be obvious and will, in part, appear hereinafter.

For a more complete understanding of the nature and scope of the invention, reference may now be had to the following detailed description thereof taken in connection with the accompanying drawings, wherein.

Figure 1:
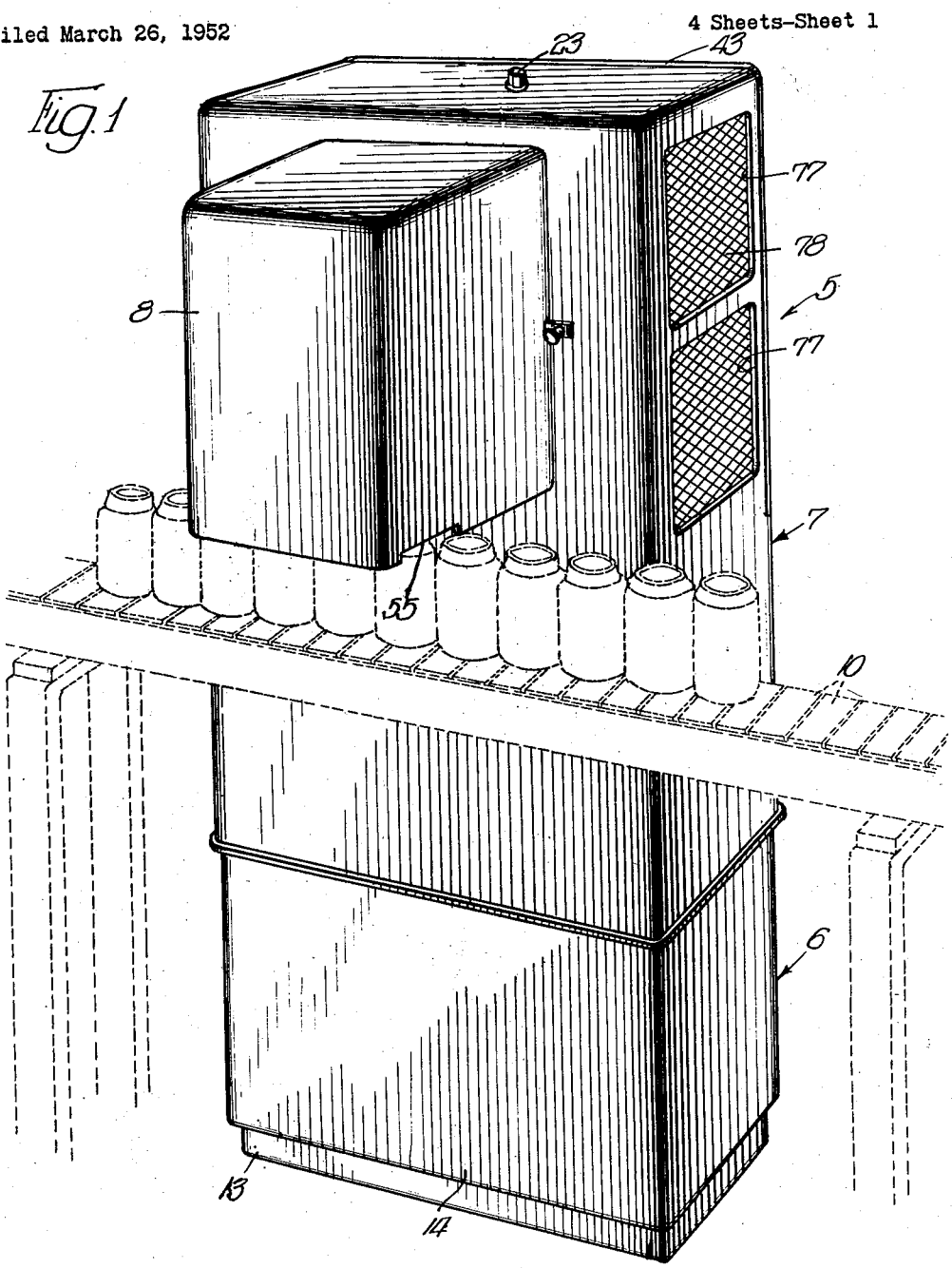
Fig. 1 is a front perspective view of a pneumatic cleaning unit embodying the invention with a section of a conveyor and a series of containers mounted thereon and being shown in broken line in the proper relationship to the unit.

The cleaning unit is indicated generally at 5 in Fig. 1. It comprises a stationary bottom portion indicated generally at 6 and a vertically adjustable upper portion indicated generally at 7. The upper section 7 has a hood 8 fastened to the front side so as to fit over a conveyor 10 which conveys the empty containers into the filling and capping machines.

Figure 2:
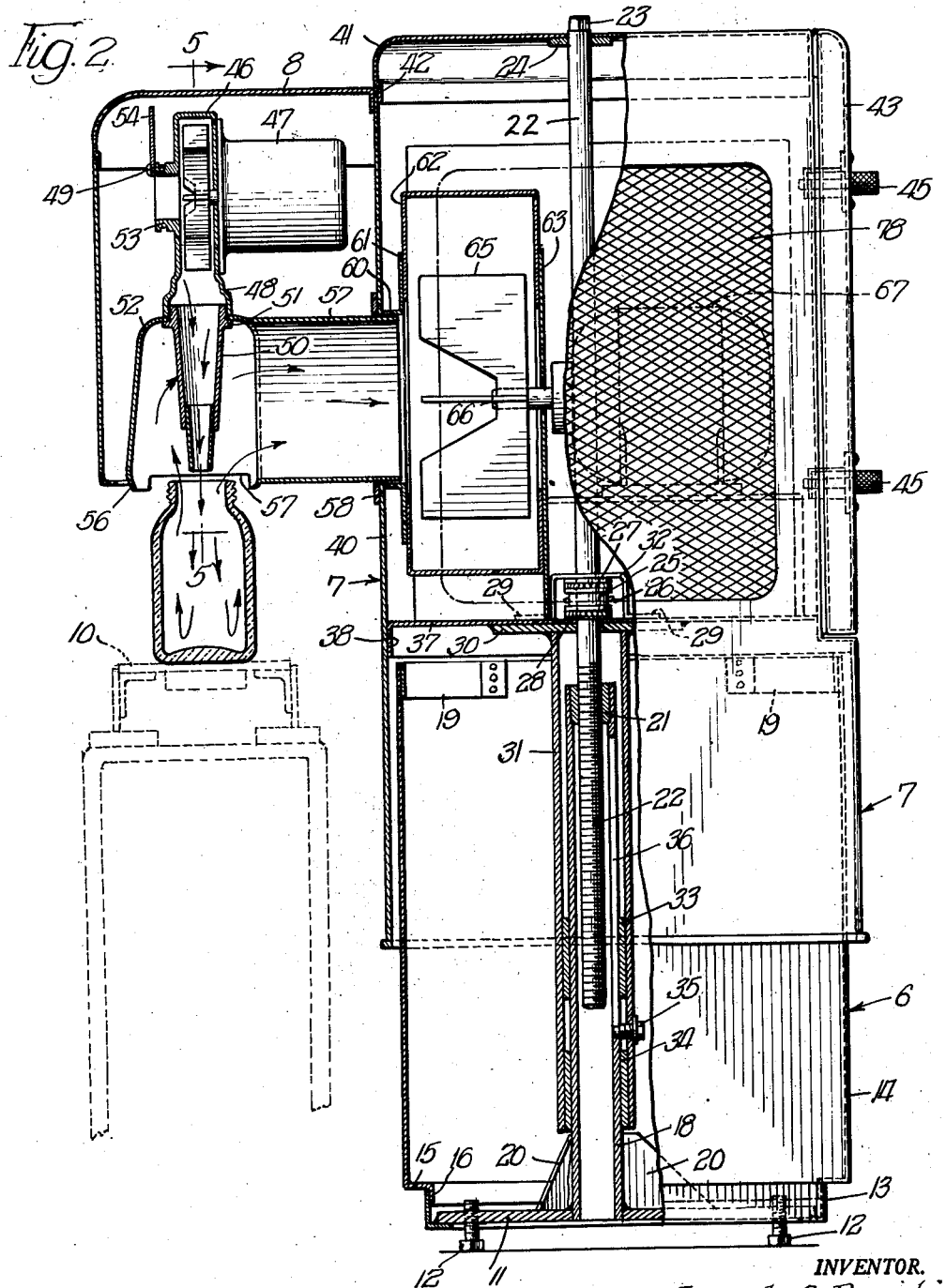
Fig. 2 is a side view of the cleaning unit shown in Fig. 1, the view being partly in elevation and partly in vertical section.
Figure 3:
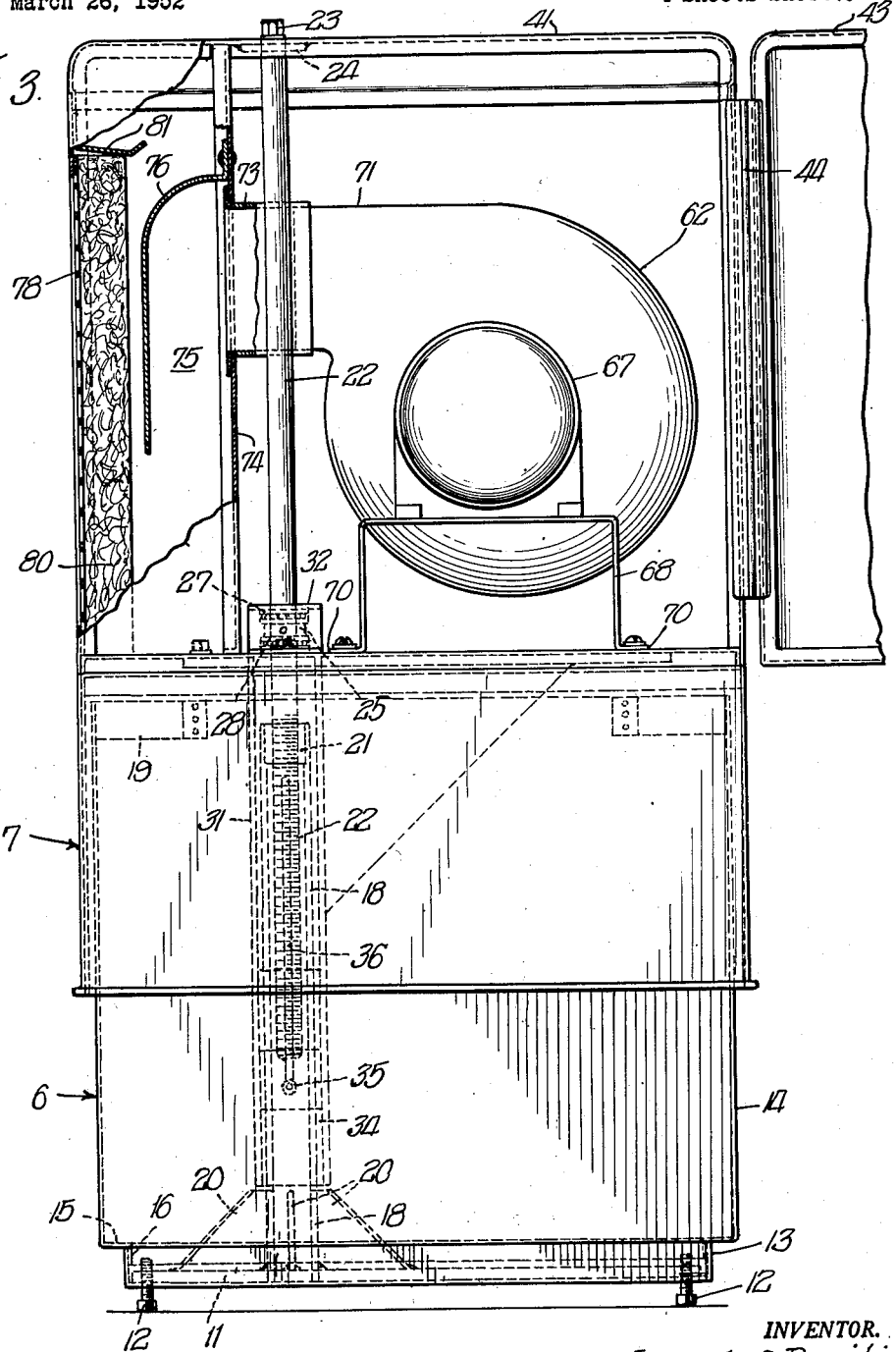
Fig. 3 is a rear elevational view of the unit shown in Fig. 1 with the door being opened and a portion of the interior broken away.
Figure 4:
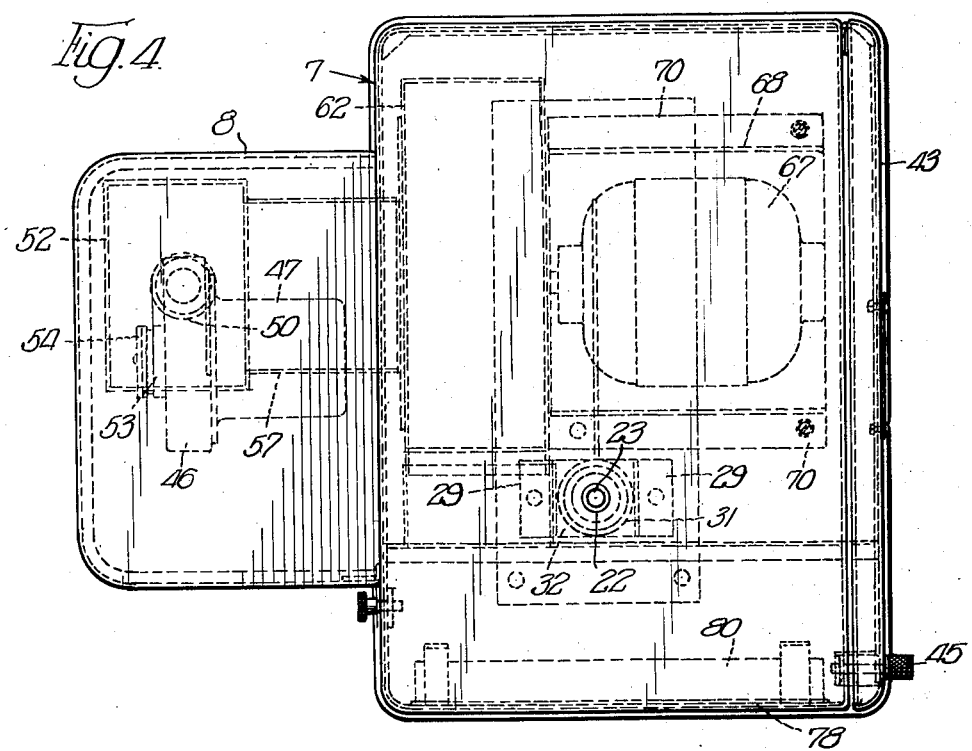
Fig. 4 is a top plan view of the cleaning unit.
Figure 5:
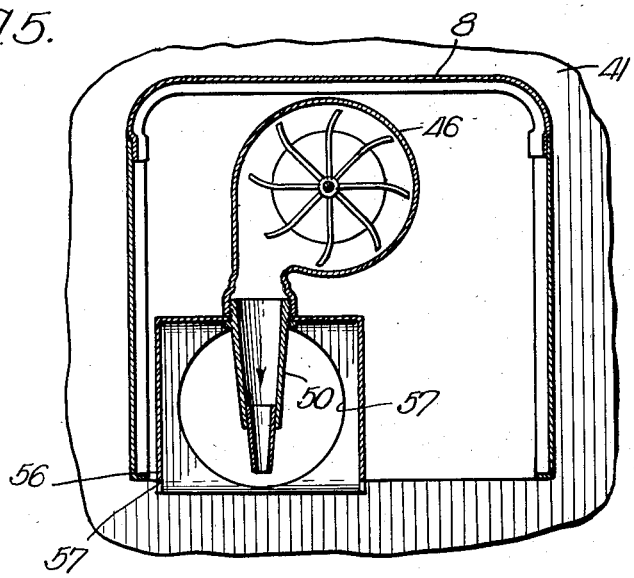
Fig. 5 is a fragmentary vertical sectional view taken on line 5—5 of Fig. 2.

Referring to Figs. 2 and 3, it will be seen that the stationary base or bottom portion 6 comprises a base plate 11 which is rectangular in shape and which is provided at each of the corners with adjustable floor engaging lugs 12—12. A rectangular bottom frame 13 is secured underneath the plate 11 with the vertical flange thereof extending upwardly therearound. A housing or apron 14 for the stationary lower portion of the cleaner 5 is provided with an inwardly turned flange 15 and a downwardly turned flange or rim 16 so as to interfit within the vertical flange of the frame 13 as shown. The lower housing 14 extends well up into an upper housing 40, the bottom portion of which telescopically interfits with the upper portion of the lower housing 14. Corner braces 19—19 are provided at the top of the apron or housing 14 for adding strength and rigidity thereto.

The base plate 11 supports a hollow column or post 18 which extends up to a level adjacent the upper end of the lower housing 14. The column 18 is welded into a hole provided therefor in the base plate 11 and is further braced and secured thereon by means of three gusset plates 20—20. A nut 21 is welded or otherwise secured in the upper end of the column 18 for cooperation with an elongated adjusting screw 22. The lower end of the screw 22 is externally threaded as shown for cooperation with the nut 21 and the upper end of the screw has a nut 23 integrally formed thereon which projects above the top of the upper housing 17. A bearing ring 24 is welded to the under side of the top of the housing 17 as shown in Fig. 2 through which the upper end of the rod 22 passes. A thrust collar 25 is secured to the rod 22 intermediate its end and is fastened in position by means of a pin 26. The collar 25 serves to separate the opposing races of a pair of ball bearings 27 and 28 fitting around the rod 22. The lower ball bearing 28 rests on a horizontal platform 30 which is welded to the upper end of a sleeve 31 which fits telescopically over the column 18. A U-shaped strap 32 having outwardly projecting feet 29 is secured on top of the platform 30 and is provided with a central opening in the upper side thereof for accommodating the rod 22. The upper bearing 27 engages the under side of the horizontal portion of the U-shaped member 32 as shown.

The sleeve 31 may be somewhat larger than the column 18 and in order to provide a smooth inter fit therewith which is free from play and tilting, the sleeve 31 is provided on the interior adjacent the bottom end thereof with two spaced apart sleeve bearings 33 and 34. It will be seen that when the rod 22 is turned by applying a wrench to the nut 23 on the upper end thereof the rod necessarily is raised or lowered depending upon the particular direction in which it is rotated. The movement of the rod 22 in a vertical direction carries with it the platform 30 and the sleeve 31 which slides over the column 18. In order to eliminate any angular twisting or rotation of the sleeve 31 relative to the column 18, the sleeve 31 is provided adjacent its lower end with a bolt 35 (Fig. 2), the inner end of which has a reduced diameter which permits it to fit accurately with sufficient tolerance for smooth sliding action in an elongated vertical slot 36 provided in the side of the column 18. This arrangement prevents the sleeve 31 and the upper portion of the machine carried thereby from rotating or twisting even a small amount on the support base.

A floor member 37 having a downwardly turned side flange 38 is carried by the support platform 30. The vertically adjustable upper section 7 of the unit 5 includes a housing 40 which is connected to and supported by the floor member 37. The upper end of the housing 40 is enclosed by a cover member 41 having an inwardly set bottom rim or flange 42 so as to permit it to fit in and rest upon the upper edge of the housing 40. The rear side of the housing 40 is open above the level of the floor member 37 and is provided with a swinging door 43 hinged to one corner of the housing 40 by means of an elongated hinge 44 as shown in Fig. 3. The opposite edge of the door 43 is provided with catches 45—45 (Fig. 2) of known type or other suitable closing means for keeping it closed.

The hood 8 is secured to the front side of the housing 40 by a hinge or other suitable known means. The hood 8 is designed to extend over a conveyor platform as shown in Fig. 1. A blower 46 driven by an attached motor 47 is disposed within the upper portion of the hood 8 with the discharge connection 48 being connected with the rear or upper end of an air nozzle or jet 50. The nozzle 50 may be screwed into the outlet connection 48 and the flange 51 around the nozzle serves as a shoulder to fit against the under side of a central opening for the nozzle provided in a bonnet 52. The inlet opening into the blower 46 is indicated at 53 which is provided with a closure plate 54 which is held in place by a screw 49 so that it may be held fully open as shown or partly closed over the inlet 53 if it is desired to reduce the volume of the air blast delivered through the nozzle 50. The bottom edge of the hood 8 is provided in the opposite sides thereof with shallow notches or recesses 55—55 (Fig. 1) and the discharge or bottom end of the nozzle 50 is preferably positioned slightly above the upper edges of the notches 55 so as to insure that any containers that will pass underneath the hood 8 will also pass underneath the nozzle 50. The bonnet 52 which surrounds the nozzle 50 so as to form a suction chamber therearound has an inwardly curved bottom lip or rim 56 which is provided with recesses or notches 57 in the opposite sides thereof which register with the corresponding recesses or notches 55 in the hood 8 and approximately even therewith. The rim or lip 56 extends down slightly below the lower end of the nozzle so that the front and rear sides of the bonnet 52 can project somewhat below the upper edges of the containers being cleaned.

The bonnet 52 is supported by welding or otherwise on the front or outer end of a horizontal duct 57 which registers with an opening provided therefor in the rear side of the bonnet 52. The duct 57 passes through the front side wall of the housing 40 and is connected to the housing by means of a flat ring 59. The duct 57 projects rearwardly within the housing 40 into a collar 60 having an integrally formed flange 61 which is secured against the front side of a blower housing 62. This housing is in part supported from the rear side by means of an upright support panel 63 which rests on the floor member 37. The blower wheel 65 within the housing 62 is carried on the end of a shaft 66 which is driven by means of an electric motor 67. The motor 67 is supported upon a U-shaped stand 68 (Fig. 3) having outwardly extending feet 70—70 by means of which it is secured to the floor member 37. The discharge connection 71 of the blower housing 62 fits into a thimble 73 carried by a vertical partition member 74 which constitutes the inner side wall of a filter chamber indicated at 75 in Fig. 3. A deflector plate or baffle 76 is attached to the partition member 74 so as to extend down in front of the opening therein through which the thimble 73 fits. The side wall of the upper housing 40 opposite the panel 74 and defining the outer side wall of the filter chamber 75 is provided with a pair of rectangular openings or windows indicated at 77—77 in Fig. 1. On the interior a perforated metal plate 78 is secured over the inside of the openings 77 and a replaceable type air filter 80 is inserted against the perforated plate 78 and held in place at the top by means of a spring clip member 81 which is secured to the interior of the housing as shown.

The operation of the cleaning unit 5 is as follows: The upper section 7 of the unit 5 is first adjusted by turning the rod 22 until the nozzle and bonnet 52 are at a level so that they properly clear the mouths or upper ends of the containers to be cleaned. The hood 8 may be hinged to the housing 40 so as to permit it to be swung open while this adjustment is being made. The electric motors 47 and 67 are then turned on so as to operate the respective blowers, thereby creating a blast of air discharging from the nozzle 50 and creating a suction within the bonnet 52. While the nozzle 50 imparts some jet effect to the air, there should be a large volume of air in the blast with adequate velocity as distinguished from a pin-point jet of extremely high velocity. When the conveyor 19 is put into operation the containers thereon will be successively passed underneath the nozzle 50. The tip opening of the nozzle 50 is of such a diameter that it is appreciably smaller than the diameters of the mouths of the containers. Any particular nozzle 50 may be replaced by another nozzle of different size as required depending upon the containers being cleaned. The high velocity air jet strikes the bottom of the container and then reverses its flow and the air stream rises column-wise around the downwardly directed jet. Actually, there will be considerable turbulence within the containers as they are cleaned. All dust, dirt and debris are dislodged and carried out of the container with the upstream which at the mouth of the container merges with the low pressure or suction created within the bonnet 52 so that a constant stream of air is being withdrawn upwardly through the bottom of the bonnet 52 and passes through the duct 57 into the inlet opening of the blower housing 62 from which it is discharged into the filter chamber 75. The air passes down underneath the deflector or baffle plate 76 and then is free to pass out through the filter 80 and through the openings 77. Dust and dirt collect in and on the inner face of the filter 80 while larger particles of debris fall to the bottom of the filter and are periodically removed.

Because of the fact that the bonnet 52 and the nozzle 50 are located within the hood 8 and a separate blower is used to create suction for application to the bonnet 52, the general movement of air in the hood is upward, either into the bonnet 52 or into the hood itself. Thus, once the dust and foreign particles are blown out of the container, they are immediately removed and carried away and they are not free to fall into containers which have already been cleaned on passage underneath the nozzle. This is an important feature since otherwise some of the dust, dirt and debris dislodged from one container might merely hover in the air surrounding the cleaning device and settle into containers that have already been cleaned.

In the over-all balancing of the pressure and suction forces it will be seen that the discharge force of the nozzle 50 is balanced necessarily by the intake suction into the blower 46. The balance of this relationship is self-maintained. To this balanced relationship is added the negative pressure or suction created in the bonnet 52. Therefore, it will be seen that the general movement of air within the hood and within the vicinity of the bottom thereof is inwardly through the duct 57 so that none of the dust and dirt-laden or contaminated air is discharged around the hood 8 but, on the contrary, it is all collected and withdrawn into the upper housing 7 from which it is discharged through the openings 77 after having been filtered.

It will be seen that the unit 5 is enclosed in a cabinet even though the upper portion 7 thereof is vertically adjustable. Because of the streamlined and smooth surface construction of the housings of the cabinet, it is easy to maintain the exterior clean and free from dirt and dust, thereby contributing to the better operation of the cleaning unit 5.

Since certain changes in design of a detailed nature will be obvious and may be made without departing from the spirit and scope of the invention, all matter described above or shown in connection with the accompanying drawing is intended to be interpreted as illustrative and not in a limiting sense.

What is claimed as new is:

1. Apparatus for pneumatically cleaning a procession of containers conveyed open end up past the same, said apparatus being vertically adjustable to the height of the containers and comprising, a stationary support base, a vertically adjustable support platform, means for adjustably supporting said platform above said base at various levels, a hood supported open side down and under which containers are adapted to be conveyed, a nozzle mounted in said hood with the discharge end thereof pointing down and approximately level with the bottom portions of said hood under which the containers pass so as to fit over the container mouths with enough clearance to avoid striking the same when said platform is adjusted to an elevation whereat the containers can be passed under said hood, a bonnet surrounding said nozzle so as to form a suction chamber therearound and mounted within said hood with the bottom opening thereof approximately level with the bottom of said hood; a blower the discharge opening of which is connected to the inlet end of said nozzle, a second blower the intake opening of which is connected with said bonnet above said bottom opening therein, and means for unitarily supporting said hood, nozzle, bonnet and blowers on said vertically adjustable platform.

2. Apparatus for pneumatically cleaning a procession of containers conveyed open end up past the same, said apparatus being vertically adjustable to the height of the containers and comprising, a stationary support base, a vertically adjustable support platform, means for adjustably supporting said platform above said base at various levels, a hood supported open side down and under which containers are adapted to be conveyed, a nozzle mounted in said hood with the discharge end thereof pointing down and approximately level with the bottom portions of said hood under which the containers pass so as to fit over the container mouths with enough clearance to avoid striking the same when said platform is adjusted to an elevation whereat the containers can be passed under said hood, a bonnet surrounding said nozzle so as to form a suction chamber therearound and mounted within said hood with the bottom opening thereof approximately level with the bottom of said hood, a blower mounted wholly within said hood and having the discharge opening thereof connected to the inlet end of said nozzle, a second blower disposed outside of said hood with the intake opening thereof connected with said bonnet above said bottom opening therein, and means for unitarily supporting said hood, nozzle, bonnet and blowers on said vertically adjustable platform.

3. Apparatus for pneumatically cleaning a procession of containers conveyed open end up past the same, said apparatus being vertically adjustable according to the height of the containers and comprising, a stationary horizontal support base, a vertically adjustable support platform, means for adjustably supporting said platform above said base at various levels, a bottom housing supported from said stationary base and enclosing the lower portion of said apparatus, an upper housing supported by said adjustable platform enclosing the upper portion of said apparatus and fitting telescopically over said lower housing, a hood which is open at the bottom attached to one side of said upper housing and under which the containers are adapted to be conveyed, a nozzle mounted in said hood with the discharge end thereof pointing down and approximately level with the bottom portions of said hood under which the containers pass so as to fit over the mouths of said containers to be cleaned with enough clearance to avoid striking the same when said platform is adjusted to the correct elevation, a bonnet surrounding said nozzle so as to form a suction chamber therearound and mounted within said hood so that the bottom opening thereof is approximately level with the bottom of said hood thereby fitting around the mouth of a container positioned under said nozzle, a blower mounted wholly within said hood with the discharge opening thereof connected to said nozzle for delivering air thereinto, a second blower mounted in said upper housing, and duct means connecting said suction chamber with the intake opening into said second blower, said upper housing having an opening therein for venting the discharge of said second blower.

4. Apparatus for pneumatically cleaning a procession of containers conveyed open end up past the same, said apparatus being vertically adjustable according to the height of the containers and comprising, a stationary horizontal support base, a column supported on said stationary base, a nut carried in said column, an elongated rod having a screw on the lower end thereof passing through said nut and projecting down into said column, a sleeve member fitting telescopically over said column, platform means supported on the upper end of said sleve, thrust bearing means interconnecting said platform and said elongated rod so that said platform is carried up and down depending on which direction said rod is turned in said screw, a bottom housing supported from said stationary base and enclosing the lower portion of said apparatus, an upper housing supported by said platform enclosing the upper portion of said apparatus and fitting telescopically over said lower housing, a hood open at the bottom attached to one side of said upper housing and under which the containers are adapted to be conveyed, a nozzle mounted in said hood with the discharge end thereof pointing down and terminating approximately level with the bottom portions of said hood under which the containers pass so as to fit over the mouths of said containers to be cleaned with enough clearance to avoid striking the same when said platform is adjusted to the correct elevation, a bonnet surrounding said nozzle so as to form a suction chamber therearound and mounted within said hood so that the bottom opening thereof is approximately level with the bottom of said hood thereby fitting around the mouth of a container positioned under said nozzle, a blower mounted wholly within said hood with the discharge opening thereof connected to said nozzle for delivering air thereinto, a second blower mounted in said upper housing, and duct means connecting said suction chamber with the intake opening into said second blower, said upper housing having an opening therein for venting the discharge of said second blower, said elongated rod projecting through the top of said upper housing whereby it may be rotated to adjust the level of said platform and said upper housing.

5. The apparatus called for in claim 4 wherein said telescopically interfitting sleeve member and column are locked against relative twisting by means of projection means carried by one of these elements which projects into a vertical groove formed in the other.

6. The apparatus called for in claim 4 wherein said telescopically interfitting sleeve member and column are locked against relative twisting by means of an inwardly projecting bolt carried on said sleeve member the end of which fits slidably into a vertical slot formed in said column.

7. The apparatus called for in claim 4 wherein there is substantial clearance between the interior of said sleeve member and the exterior of said column, and said sleeve member is provided adjacent the lower end therof with sleeve bearings which fit slidably over said column so as to prevent tilting of said sleeve member thereon.

8. Apparatus for pneumatically cleaning a procession of containers conveyed open end up past the same, said apparatus being vertically adjustable with respect to the level of the mouths of the containers to be cleaned, comprising in combination, a stationary support base, a hollow vertical column supported on said base, a nut mounted in the upper end of said column, an elongated adjusting rod having screw threads formed on the bottom end thereof for threaded engagement with said nut, a sleeve member fitting telescopically over said column, platform and floor means carried on the upper end of said sleeve member, thrust bearing means interconnecting said platform and said elongated rod whereby the latter is free to turn relative to the former thereby raising or lowering said platform depending upon the direction of rotation of said rod in said stationary nut, a bottom housing supported on said stationary base and enclosing the lower portion of said apparatus up to approximately the level of the upper end of said column, an upper housing supported on said platform and floor means having a skirt portion which depends below said floor means and fits telescopically over said bottom housing, a hood open at the bottom and attached to one side of said upper housing above said floor means and under which hood the containers to be cleaned are adapted to be passed from side to side, a nozzle vertically mounted in said hood with the bottom discharge end thereof terminating aproximately level with the bottom of said hood, a bonnet surrounding said nozzle so as to form a suction chamber therearound and mounted within said hood so that the bottom opening thereof is approximately level with the bottom of said hood thereby permitting it to fit around the mouth of a container located under said nozzle, a blower mounted wholly within the upper portion of said hood with the discharge outlet thereof connected with the upper end of said nozzle, a second blower mounted wholly on said floor means within the upper housing, duct means interconnecting a side opening in said bonnet with the inlet opening into said second blower, a vertical partition in said upper housing defining a filter chamber at one side thereof, second duct means communicating between the discharge outlet of said second blower and the interior of said filter chamber, a window in one of the exterior walls of said filter chamber, and an air filter fitting over the interior of said window so as to filter the air discharged therethrough, said elongated rod projecting through the top wall of said upper housing whereby the same may be turned so as to adjust the level of said hood and upper housing from the exterior thereof.

JOSEPH C. PACILIO.

References Cited in the file of this patent

UNITED STATES PATENTS

| Number | Name | Date |
| --- | --- | --- |
| 2,073,746 | Keller | Mar. 16, 1937 |
| 2,250,238 | Smith | July 22, 1941 |